US009247347B2

(12) United States Patent
Kitazawa

(10) Patent No.: US 9,247,347 B2
(45) Date of Patent: Jan. 26, 2016

(54) NOISE SUPPRESSION APPARATUS AND CONTROL METHOD THEREOF

(71) Applicant: CANON KABUSHIKI KAISHA, Tokyo (JP)

(72) Inventor: Kyohei Kitazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 14/139,560

(22) Filed: Dec. 23, 2013

(65) Prior Publication Data

US 2014/0185827 A1 Jul. 3, 2014

(30) Foreign Application Priority Data

Dec. 27, 2012 (JP) ................................ 2012-286163

(51) Int. Cl.
*H04B 15/00* (2006.01)
*H04R 3/00* (2006.01)
*G10L 21/0216* (2013.01)

(52) U.S. Cl.
CPC ............ *H04R 3/005* (2013.01); *G10L 21/0216* (2013.01); *H04R 2410/07* (2013.01); *H04R 2430/20* (2013.01)

(58) Field of Classification Search
None
See application file for complete search history.

(56) References Cited

U.S. PATENT DOCUMENTS

2004/0078199 A1* 4/2004 Kremer ............... G10L 21/0208 704/233
2011/0081026 A1* 4/2011 Ramakrishnan .... G10L 21/0208 381/94.3
2012/0224708 A1* 9/2012 Sugiyama ........... G10L 21/0208 381/66

FOREIGN PATENT DOCUMENTS

JP 06-269084 A 9/1994
JP 2006-047639 A 2/2006
JP 2006-154314 A 6/2006
JP 2012-022120 A 2/2012

OTHER PUBLICATIONS

Kunieda et al., "Pitch Extraction by Using Autocorrelation Function of Log Spectrum", IEICE Journal A, vol. J80-A, No. 3, pp. 435-443, 1997.

(Continued)

*Primary Examiner* — Regina N Holder
(74) *Attorney, Agent, or Firm* — Fitzpatrick, Cella, Harper & Scinto

(57) ABSTRACT

A noise suppression apparatus using spectral subtraction is provided. A noise estimation unit estimates noise components included in a mixed signal. A fundamental frequency of the mixed signal is detected. A subtraction factor in the spectral subtraction is set based on the detected fundamental frequency. The spectral subtraction for the mixed signal is executed using the set subtraction factor and the estimated noise components. A boundary frequency at the fundamental frequency or a frequency lower than the fundamental frequency is set, and a subtraction factor for a frequency lower than the boundary frequency is set to assume a value larger than a subtraction factor for a frequency not less than the boundary frequency.

18 Claims, 13 Drawing Sheets

(56) References Cited

OTHER PUBLICATIONS

Binder et al., "Speech Non-Speech Separation with GMMS", Reports of the Meeting of the Acoustical Society of Japan, 2001 (2), pp. 141-142.

Kida et al., "Voice Activity Detection Based on Optimally Weighted Combination of Multiple Features", IPSJ Study Report, SLP, Spoken language Processing 2005 (69), pp. 49-54.

* cited by examiner

FIG. 4

| FRAME | 1 | 2 | 3 | 4 | 5 | 6 | 7 | 8 | 9 | 10 | 11 |
|---|---|---|---|---|---|---|---|---|---|---|---|
| FUNDAMENTAL TONE DETECTION RESULT | 150Hz | NOT DETECTED | 160Hz | 130Hz | NOT DETECTED | NOT DETECTED | NOT DETECTED | NOT DETECTED | 150Hz | NOT DETECTED | 100Hz |
| | | ↓ | | | ↓ | ↓ | ↓ | ↓ | | ↓ | |
| FUNDAMENTAL TONE DETECTOR OUTPUT | 150Hz | 150Hz | 160Hz | 130Hz | 130Hz | 130Hz | 130Hz | 130Hz | 150Hz | 150Hz | 100Hz |

OUTPUT SAME VALUE AS PREVIOUS FRAME (frames 1→2)

OUTPUT SAME VALUE AS PREVIOUS FRAME IN TURN EVEN WHEN FRAMES IN WHICH NO FUNDAMENTAL TONE IS DETECTED CONTINUE (frames 4→8)

OUTPUT SAME VALUE AS PREVIOUS FRAME (frames 9→10)

FIG. 12

| CHANNEL | FUNDAMENTAL FREQUENCY [Hz] |
|---|---|
| 1 | 150 |
| 2 | 151 |
| 3 | 159 |
| 4 | 146 |
| 5 | 145 |
| 6 | 100 |
| 7 | 151 |
| 8 | 155 |

FIG. 13

| FRAME | 1 | 2 | 3 | 4 | 5 | 6 | 7 | 8 | 9 | 10 | 11 |
|---|---|---|---|---|---|---|---|---|---|---|---|
| FUNDAMENTAL TONE DETECTION RESULT | NOT DETECTED | 150Hz | 160Hz | 130Hz | NOT DETECTED | NOT DETECTED | NOT DETECTED | NOT DETECTED | 150Hz | 100Hz | NOT DETECTED |
| | | ↓ | | | ↓ | ↓ | ↓ | ↓ | | ↓ | |
| FUNDAMENTAL TONE DETECTOR OUTPUT | 150Hz | 150Hz | 160Hz | 130Hz | 134Hz | 138Hz | 142Hz | 146Hz | 150Hz | 100Hz | 100Hz |

OUTPUT SAME VALUE AS SUBSEQUENT FRAME (frames 1–2)

LINEAR INTERPOLATED VALUE (frames 5–8)

OUTPUT SAME VALUE AS PREVIOUS FRAME (frames 10–11)

NOISE SUPPRESSION APPARATUS AND CONTROL METHOD THEREOF

BACKGROUND OF THE INVENTION

1. Field of the Invention

The present invention relates to a noise suppression apparatus, which suppresses noise mixed in an audio signal, and a control method thereof.

2. Description of the Related Art

Video cameras and recent digital cameras can capture moving images, and chances of simultaneous recording of audios are increasing. In a moving image capturing operation, wind noise mixed upon audio recording poses a serious problem, and many video cameras include a function of suppressing wind noise.

Wind noise is generated when wind strikes a microphone, and has strong components over a broad low-frequency range. On the other hand, an audio signal such as a human voice has a harmonic structure including a fundamental tone and harmonic components (components having frequencies as integer multiples of the fundamental tone).

As a conventional wind noise suppression method, high-pass filtering, spectral subtraction, comb filtering, and the like are known.

The high-pass filtering is a method of cutting strong low-frequency components of wind noise by band limitations. As a cutoff frequency determination method, a method of switching cutoff frequencies by estimating an amount of wind noise has been proposed (for example, see Japanese Patent Laid-Open No. 06-269084).

The spectral subtraction is a method of suppressing noise components by estimating wind noise included in an audio, and subtracting a spectrum of estimated noise components from that of a microphone signal (for example, Japanese Patent Laid-Open No. 2006-47639).

The comb filtering is a method which focuses attention on a harmonic structure of an audio, that is, a method of executing fundamental tone detection, and passing or cutting off a fundamental frequency and harmonic components. This method is also called a comb filter since sharp peaks or dips appear at given intervals in frequency characteristics. Noise suppression based on the comb filtering includes a method of suppressing a noise frequency band by passing a fundamental tone and harmonic components, and a method of subtracting a signal, which is obtained by cutting off a fundamental tone and harmonic components, from an original signal.

However, the conventional wind noise suppression method using the high-pass filtering, when wind noise is to be sufficiently suppressed, low-frequency components such as a fundamental tone and low-order harmonic components of an audio signal are also suppressed, and the tone color of an audio is unwantedly changed.

The method using the spectral subtraction requires noise estimation, and noise estimation accuracy has to be enhanced to obtain a satisfactory spectral subtraction result. However, since wind noise is non-stationary noise, it is difficult to attain accurate noise estimation, and noise components are unwantedly left unsuppressed due to poor noise estimation accuracy. Since wind noise includes especially strong low-frequency components, it cannot be sufficiently suppressed.

Furthermore, the method using the comb filter requires fundamental tone detection (pitch detection). Comb frequencies of the comb filter have an integer multiple relationship with respect to the fundamental frequency. For this reason, when a detected fundamental tone includes an error, an error is enlarged in a high-frequency range. The relationship between the fundamental frequency and comb frequencies is given by:

$$fn=(f0+\delta)*n$$

where fn is an n-th comb frequency, f0 is a fundamental frequency, and δ is an error.

A fundamental tone error does not pose any problem when n is small. However, in harmonic components in a high-frequency range in which n is large, that error is enlarged in proportion to n. For this reason, an original harmonic structure may be suppressed. Since the fundamental tone detection accuracy lowers as noise is larger, accurate comb filter design suffers a problem in its feasibility.

SUMMARY OF THE INVENTION

The present invention has been made to solve the aforementioned problems. That is, the present invention provides a noise suppression apparatus and method, which are robust against a fundamental tone detection error, and can suppress low-frequency wind noise components without impairing an audio signal.

According to one aspect of the present invention, there is provided a noise suppression apparatus for suppressing noise components included in a mixed signal, in which audio components and the noise components are mixed, by spectral subtraction, comprising: a noise estimation unit configured to estimate the noise components included in the mixed signal; a fundamental tone detection unit configured to detect a fundamental frequency of the mixed signal; a factor setting unit configured to set a subtraction factor in the spectral subtraction based on the detected fundamental frequency; and a spectral subtraction unit configured to execute the spectral subtraction for the mixed signal using the set subtraction factor and the estimated noise components, wherein the factor setting unit sets a boundary frequency at the fundamental frequency or a frequency lower than the fundamental frequency, and sets a subtraction factor for a frequency lower than the boundary frequency to assume a value larger than a subtraction factor for a frequency not less than the boundary frequency.

Further features of the present invention will become apparent from the following description of exemplary embodiments (with reference to the attached drawings).

BRIEF DESCRIPTION OF THE DRAWINGS

FIG. 4 is a table showing an output example of a fundamental tone detector in frames in which no fundamental tone is detected;

FIG. 12 is a table showing an example of fundamental frequencies of eight channels; and FIG. 13 is a table showing another output example of a fundamental tone detector in frames in which no fundamental tone is detected.

DESCRIPTION OF THE EMBODIMENTS

Various exemplary embodiments, features, and aspects of the invention will be described in detail below with reference to the drawings. Note that the arrangements to be described in the following embodiments are presented only for the exemplary purpose, and the present invention is not limited to the illustrated arrangements.

First Embodiment

Figure 1:
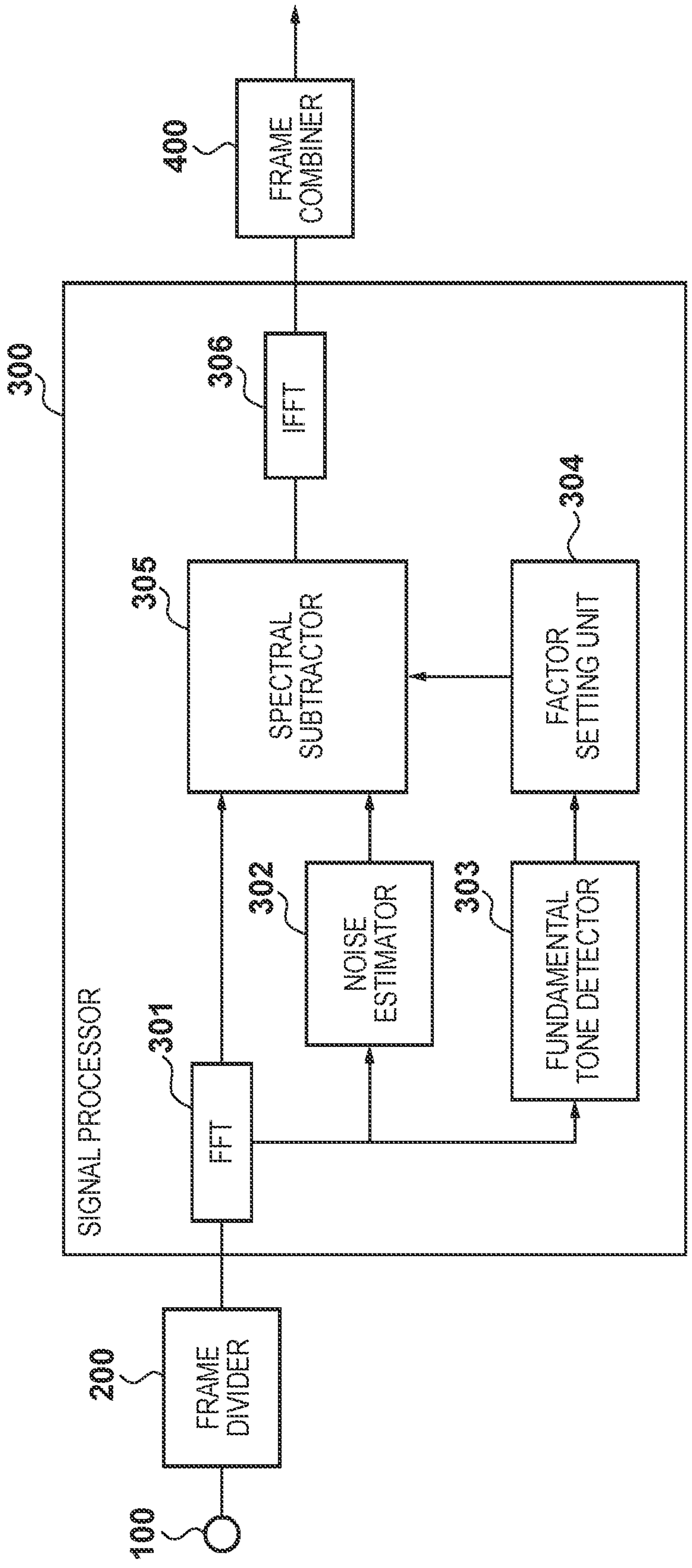
FIG. 1 is a block diagram showing the arrangement of a noise suppression apparatus according to the first embodiment.

In this embodiment, a wind noise signal mixed upon audio recording is suppressed using the spectral subtraction. FIG. 1 is a block diagram showing the arrangement of a noise suppression apparatus according to the first embodiment of the present invention. The noise suppression apparatus of this embodiment includes an audio signal input unit 100, frame divider 200, signal processor 300, and frame combiner 400.

The audio signal input unit 100 includes a microphone and A/D converter, A/D-converts an acquired audio signal and noise signal mixed in that audio signal (to be referred to as "mixed signal" hereinafter), and outputs a digital mixed signal to the frame divider 200. The frame divider 200 applies a window function to the mixed signal input from the audio signal input unit 100 while shifting a time interval by a predetermined duration to extract and output signals for specific durations.

The signal processor 300 executes noise suppression processing, and outputs signals obtained as a result of the processing to the frame combiner 400. Details of the signal processor 300 will be described later. The frame combiner 400 combines and outputs signals for respective frames output from the signal processor 300 while overlapping the signals each other.

The signal processor 300 will be described in detail below. The signal processor 300 includes an FFT unit 301, noise estimator 302, fundamental tone detector 303, factor setting unit 304, spectral subtractor 305, and IFFT unit 306, as shown in FIG. 1. The FFT unit 301 takes the FFT (Fast Fourier Transform) of the mixed signals divided into frames, which are input from the frame divider 200, and outputs the processed signals. The noise estimator 302 estimates wind noise included in the mixed signals with respect to the outputs from the FFT unit 301, and outputs estimated noise signals. For example, the noise estimator 302 can estimate noise using a wind noise model, as described in Japanese Patent Laid-Open No. 2006-47639. That is, the noise estimator 302 has a wind noise model unique to the microphone of the audio signal input unit 100 as a database, selects similar data from the wind noise model for each frame, and outputs a frequency spectrum of wind noise.

The fundamental tone detector 303 applies fundamental tone detection to the outputs of the FFT unit 301. For example, the fundamental tone detection is executed using a cepstrum method. The cepstrum method is calculated as a result of taking the inverse Fourier transform of a logarithmic amplitude spectrum of an input signal. This method is different from an original definition, but it is generally used. The dimension of a cepstrum is a physical amount corresponding to a time called quefrency, and a peak appears at a position corresponding to a fundamental tone for an audio having a harmonic structure. For example, assuming that a sampling frequency of an audio is 48 kHz, and a fundamental frequency is 100 Hz, a large peak appears at a position of a 480th sample.

Thus, a fundamental tone is detected by detecting a peak within a range that the fundamental tone of an audio signal can assume, for example, a range corresponding to 50 Hz to 1 kHz, and a fundamental frequency is output to the factor setting unit 304. That is, assuming that a sampling frequency of a signal is 48 kHz, a peak is detected from 48th to 960th samples. Note that when there are a plurality of sound sources, a plurality of fundamental tones (peaks) are often detected. In this case, a fundamental tone having the lowest frequency of the detected fundamental tones is output.

The factor setting unit 304 sets a boundary frequency at a frequency not more than the fundamental frequency input from the fundamental tone detector 303. Then, the factor setting unit 304 sets subtraction factors of the spectral subtraction for frequencies lower than that boundary frequency to be values larger than subtraction factors for other frequencies. In addition, in this embodiment, the factor setting unit 304 sets flooring factors of the spectral subtraction for frequencies lower than the boundary frequency to be values smaller than flooring factors for other frequencies. The subtraction factor and flooring factor will be described later.

The spectral subtractor 305 executes the spectral subtraction using the mixed signal and frequency spectrum of the estimated noise signal input from the FFT unit 301 and noise estimator 302, and outputs a result to the IFFT unit 306.

Letting X be a frequency spectrum of a mixed signal, N be a frequency spectrum of estimated noise, β be a subtraction factor, and Y be an output, the spectral subtraction can be described by:

$$Y(f) = \sqrt[n]{|X(f)|^n - \beta(f) \cdot |N(f)|^n} \cdot e^{j \cdot arg(X(f))} \tag{1}$$

where f is a frequency. Also, "1" (amplitude) or "2" (power) is normally used as n, but other values may be used.

In the spectral subtraction, a noise spectrum to be subtracted is multiplied by a subtraction factor β used to change a processing strength. The subtraction factor β is generally set to be "1" or more. When β≥1, a content of the n-th power root of equation (1) may assume a negative value. In order to avoid this, processing called "flooring" is executed. The flooring is processing in which an output Y is to be a signal η times of a mixed signal X when the content of the n-th power root in equation (1) assumes a negative value, and is described by:

When $|X(f)|^n-\beta(f)\cdot|N(f)|^n<0$, $$Y(f)=\eta(f)\cdot|X(f)|\cdot e^{j\,arg(X(f))} \tag{2}$$

where η is a flooring factor.

Note that the subtraction factor β and flooring factor η generally assume constant values irrespective of frequencies, but in this embodiment, these factors are set by the factor setting unit 304 as follows:

$$\beta(f_{LOW})>\beta(f_{HIGH}),\eta(f_{LOW})<\eta(f_{HIGH})$$

$f_{LOW}<f0\leq f_{HIGH}$ f0: boundary frequency

With these settings, noise components at frequencies lower than the boundary frequency can be reduced more.

Figure 2A:
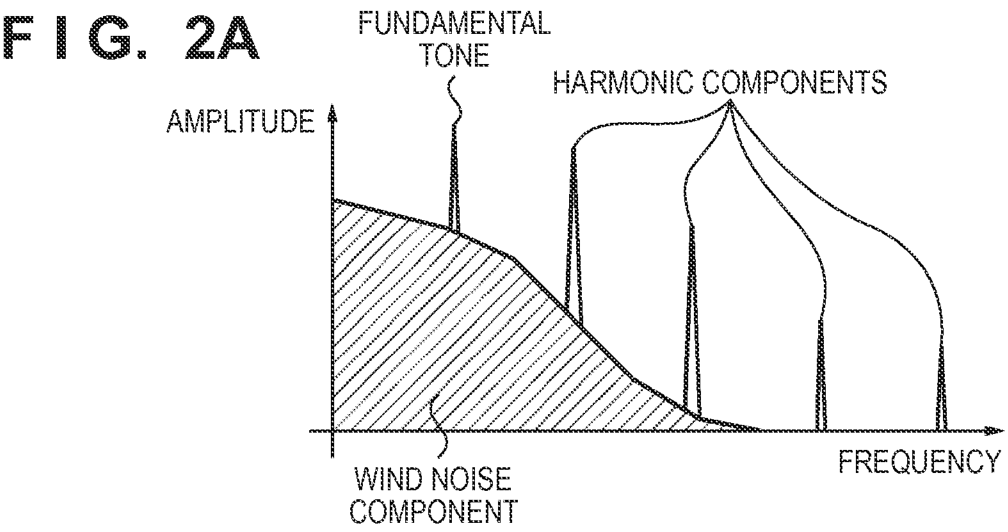
FIGS. 2A-C show graphs for explaining spectral subtraction according to the first embodiment.
Figure 2B:
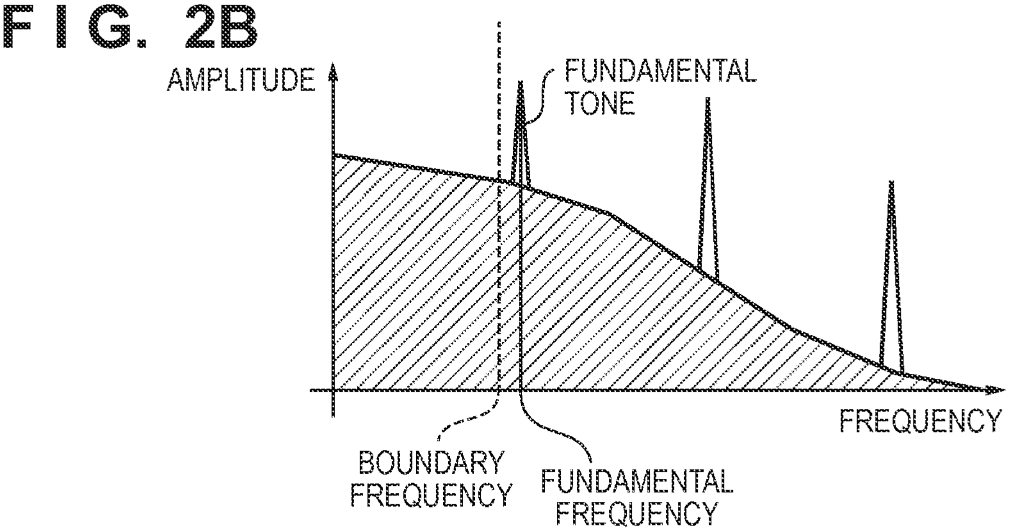
Figure 2C:
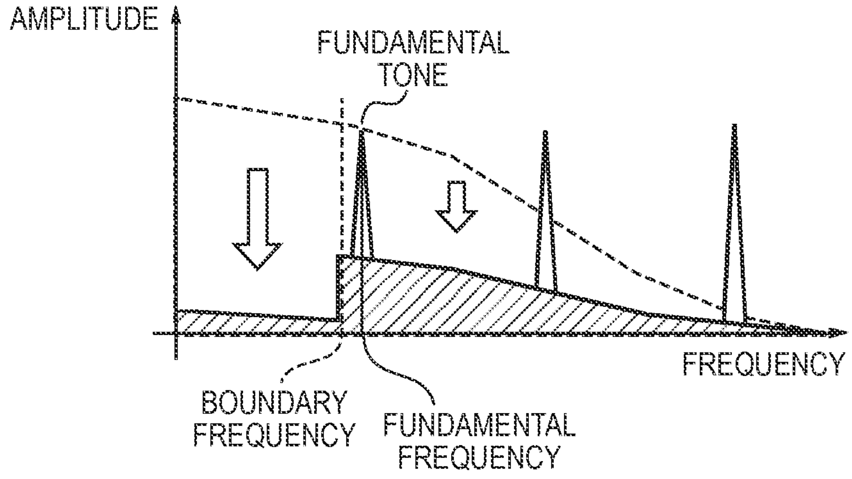

FIGS. 2A-C show graphs which illustrate the spectral subtraction in this embodiment. FIG. 2A shows the spectra of a mixed signal of a certain frame. An audio signal has a harmonic structure (a fundamental tone and harmonic components), and wind noise components include strong components in a low-frequency range. A graph shown in FIG. 2B is obtained by enlarging the low-frequency range of the graph of FIG. 2A. In this embodiment, as shown in FIG. 2B, the boundary frequency is set at a frequency not more than the fundamental frequency. Then, at frequencies lower than the boundary frequency, large subtraction factors β are set. Furthermore, at the frequencies lower than the boundary frequency, small flooring factors η can be set. In this manner, as shown in FIG. 2C, wind noise components at frequencies not more than the fundamental frequency can be largely reduced.

The IFFT unit 306 takes the IFFT (Inverse Fast Fourier Transform) of the outputs of the spectral subtractor 305, and outputs results to the frame combiner 400.

Figure 3:
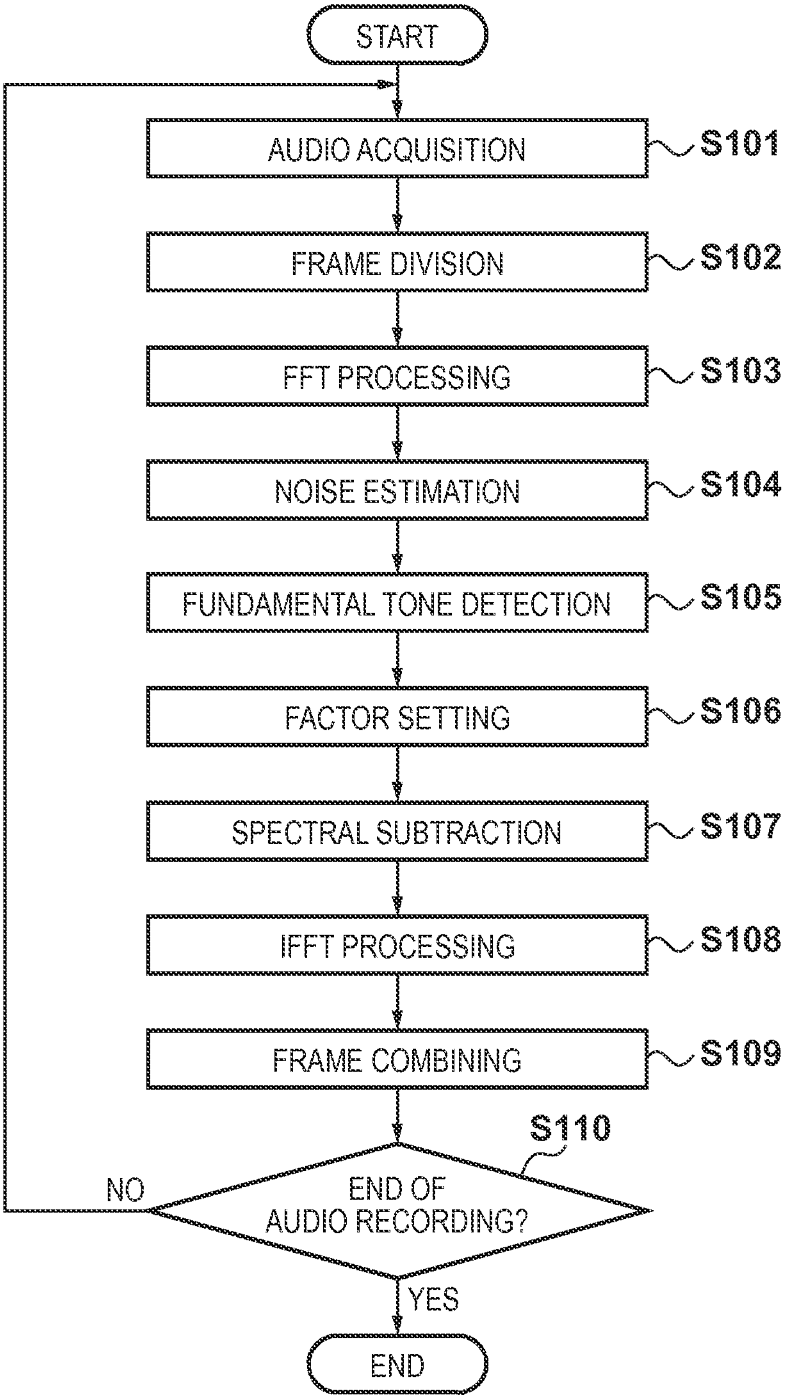
FIG. 3 is a flowchart showing noise suppression processing according to the first embodiment.

The sequence of the noise suppression processing according to this embodiment will be described below with reference to FIG. 3.

When audio recording is started, the audio signal input unit 100 acquires a mixed signal (step S101). The acquired mixed signal is output to the frame divider 200 as needed. Next, the frame divider 200 executes frame division processing (step S102). In this step, the frame divider 200 multiplies the input mixed signal by the window function while shifting the signal by a predetermined duration, thus outputting signals extracted for each specific time width to the FFT unit 301. Subsequently, the FFT unit 301 executes FFT processing for the outputs from the frame divider 200 (step S103). The signals which have undergone the FFT processing are respectively output to the noise estimator 302, fundamental tone detector 303, and spectral subtractor 305.

Next, the noise estimator 302 executes noise estimation (step S104). In this step, the noise estimator 302 executes similarity comparison between input spectra and the wind noise model to determine estimated noise spectra. The estimated noise spectra are output to the spectral subtractor 305. Subsequently, the fundamental tone detector 303 executes fundamental tone detection (step S105). In this step, the fundamental tone detector 303 detects a fundamental tone of an audio signal included in a frame of interest by the cepstrum method based on the output from the FFT unit 301, and outputs a frequency of the fundamental tone to the factor setting unit 304. If no fundamental tone is detected, the fundamental tone detector 303 outputs 0 Hz as a fundamental frequency.

Next, the factor setting unit 304 sets factors of the spectral subtraction (step S106). In this step, the factor setting unit 304 sets a boundary frequency at a frequency not more than the fundamental frequency detected by the fundamental tone detector 303. In this case, the fundamental frequency may be set as the boundary frequency. However, in consideration of a fundamental tone detection error due to noise, the boundary frequency can be set at a frequency lower than the fundamental frequency. Next, the factor setting unit 304 sets spectral subtraction parameters. The factor setting unit 304 sets large subtraction factors of the spectral subtraction and small flooring factors at frequencies lower than the boundary frequency.

After that, the spectral subtractor 305 executes spectral subtraction (step S107). In this step, the spectral subtractor 305 executes the spectral subtraction using frequency spectra output from the FFT unit 301, those output from the noise estimator 302, and the subtraction and flooring factors set by the factor setting unit 304. The spectral subtraction results are output to the IFFT unit 306.

The IFFT unit 306 executes the IFFT processing for the outputs from the spectral subtractor 305 (step S108). The signals which have undergone the IFFT processing are output to the frame combiner 400. The frame combiner 400 executes processing for combining the frame-processed signals (step S109). In this step, the frame combiner 400 combines the signals for respective frames, which have been divided into frames by the frame divider 200, and have undergone the processes, to overlap each other while shifting the signals by the predetermined duration in the same manner as in division. Then, it is checked if audio recording ends (step S110). The processes of steps S101 to S109 are repeated until it is determined in this step that audio recording ends.

As described above, according to this embodiment, the boundary frequency is controlled based on the fundamental tone of the audio signal. More specifically, a large subtraction factor is set, and a small flooring factor is set at a frequency lower than the boundary frequency. Then, noise can be suppressed without unnecessarily suppressing the low-frequency range of the audio signal.

In this embodiment, the noise estimator 302 uses the wind noise model, but it may use other methods. For example, a non-audio segment may be extracted as a signal of wind noise alone, and a unit which discriminates an audio or non-audio segment may be separately added, and a signal obtained by averaging noise spectra of the non-audio segments may be output as estimated noise.

Alternatively, the database may store an audio signal model. In this case, only audios may be extracted using the audio model, and remaining signals may be output as estimated noise.

An input to the noise estimator 302 is a frequency spectrum. When wind noise is estimated using a time waveform of signals, the frame divider 200 may be designed to directly input a time waveform. In this case, when an output from the noise estimator 302 is a time waveform, the FFT processing is executed between the noise estimator 302 and spectral subtractor 305.

Also, the fundamental tone detector 303 uses the cepstrum method, but it may use other methods in fundamental tone detection (pitch detection). For example, a method using an autocorrelation function may be used (for example, see "Pitch extraction method by using autocorrelation function of log spectrum", IEICE Journal A, Vol. J80-A, No. 3, pp. 435-443). In addition, a method using the number of zero-crossings or peaks with respect to a time waveform introduced in the above literature, a method using a filter bank, and the like may be used.

When no fundamental tone is detected by the fundamental tone detector 303, 0 Hz is output. However, since it is considered that the fundamental frequency rarely abruptly changes, when no fundamental tone is detected in the current frame, the same value as in the previous frame may be output. FIG. 4 shows an example when no fundamental tone is detected. For example, no fundamental tone is detected in frame 2, but the fundamental tone detector 303 outputs 150 Hz output in frame 1. Also, even when no fundamental tone is detected in continuous frames 5 to 8, the fundamental frequency output in the previous frame is output in turn.

Also, a segment in which no fundamental tone is detected is judged as a non-audio segment, and noise suppression is emphasized in the full frequency band. That is, a maximum frequency that can be set by the fundamental tone detector 303 may be output. Note that the maximum frequency indicates a frequency (Nyquist frequency) half of the sampling frequency of the signal input to the frame divider 200. For example, when the sampling frequency is 48 kHz, the maximum frequency is 24 kHz.

When the boundary frequency is abruptly changed, since it audibly stands out, the boundary frequency may be gradually reduced from the frequency output in the previous frame to 0 Hz using a time constant.

The factor setting unit 304 can set both the subtraction and flooring factors, but it may also set either one of the subtraction and flooring factors.

The signal processor 300 executes noise suppression using the spectral subtraction, but it may use other noise suppression methods. For example, an inverse filter which suppresses noise estimated by the noise estimator 302 may be designed and adopted. In this case, filtering parameters (weighting coefficients and the like of a filter) may be changed between frequencies not less than the boundary frequency and those lower than the boundary frequency.

Second Embodiment

Figure 5:
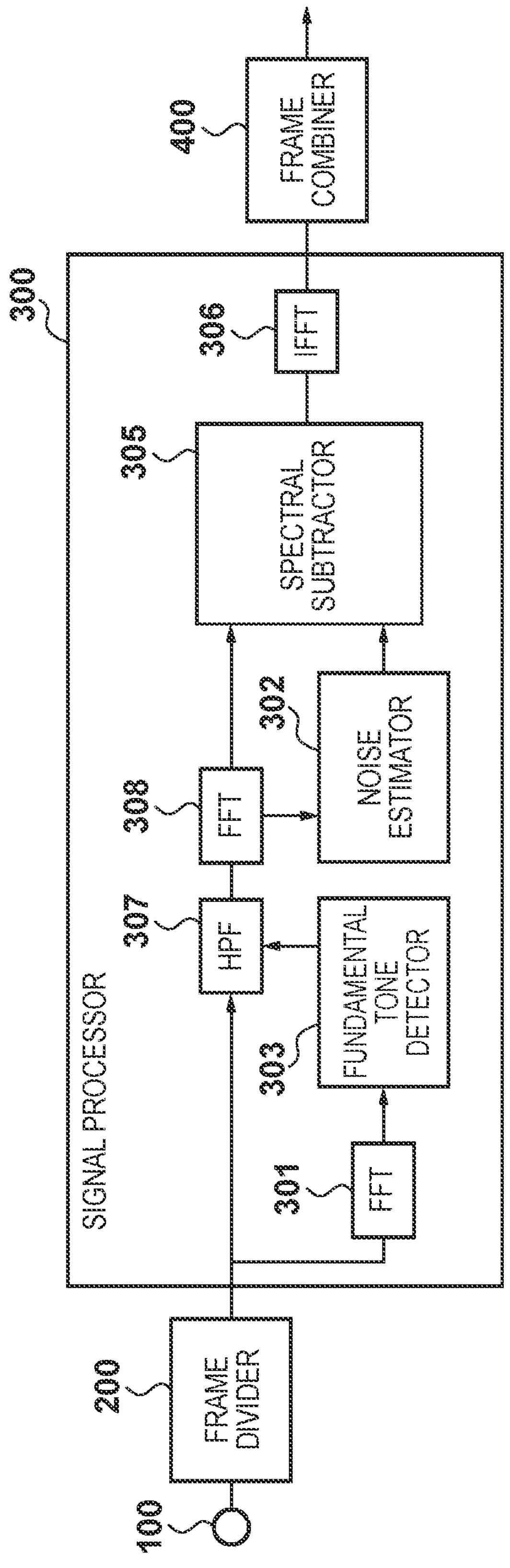
FIG. 5 is a block diagram showing the arrangement of a noise suppression apparatus according to the second embodiment.

In the second embodiment, a wind noise signal mixed upon audio recording is suppressed using a high-pass filter (to be referred to as "HPF" hereinafter) and spectral subtraction. FIG. 5 is a block diagram showing the arrangement of a noise suppression apparatus according to this embodiment. The noise suppression apparatus of this embodiment includes an audio signal input unit 100, frame divider 200, signal processor 300, frame combiner 400. Since the audio input unit 100, frame divider 200, and frame combiner 400 are the same as those in the first embodiment, a detailed description thereof will not be repeated.

The signal processor 300 includes an FFT unit 301, noise estimator 302, fundamental tone detector 303, spectral subtractor 305, IFFT unit 306, HPF 307, and FFT unit 308. Since the FFT unit 301, noise estimator 302, fundamental tone detector 303, spectral subtractor 305, and IFFT unit 306 are nearly the same as those in the first embodiment, a description thereof will not be repeated.

The HPF 307 is arranged in a stage before the spectral subtractor 305. The HPF 307 is a variable cutoff frequency HPF. The HPF 307 determines a boundary frequency from a frequency of a fundamental tone as an output from the fundamental tone detector 303, and changes a cutoff frequency to that boundary frequency. Then, the HPF 307 applies high-pass filtering to outputs from the frame divider 200. At this time, the boundary frequency may be equal to the fundamental frequency, or may be set to be relatively higher than the fundamental frequency in consideration of amplitude characteristics of the HPF. Furthermore, when the boundary frequency is set to be higher than the fundamental frequency, subtraction factors may be adjusted so as not to excessively subtract components of the fundamental frequency by the spectral subtractor 305. In this case, since 0 Hz is output when the fundamental tone detector 303 cannot detect any fundamental tone, the HPF 307 may switch processing so as to skip the HPF processing when 0 Hz is input. The FFT unit 308 takes the FFT of the outputs from the HPF 307, and outputs results to the spectral subtractor 305 and noise estimator 302.

Figure 6:
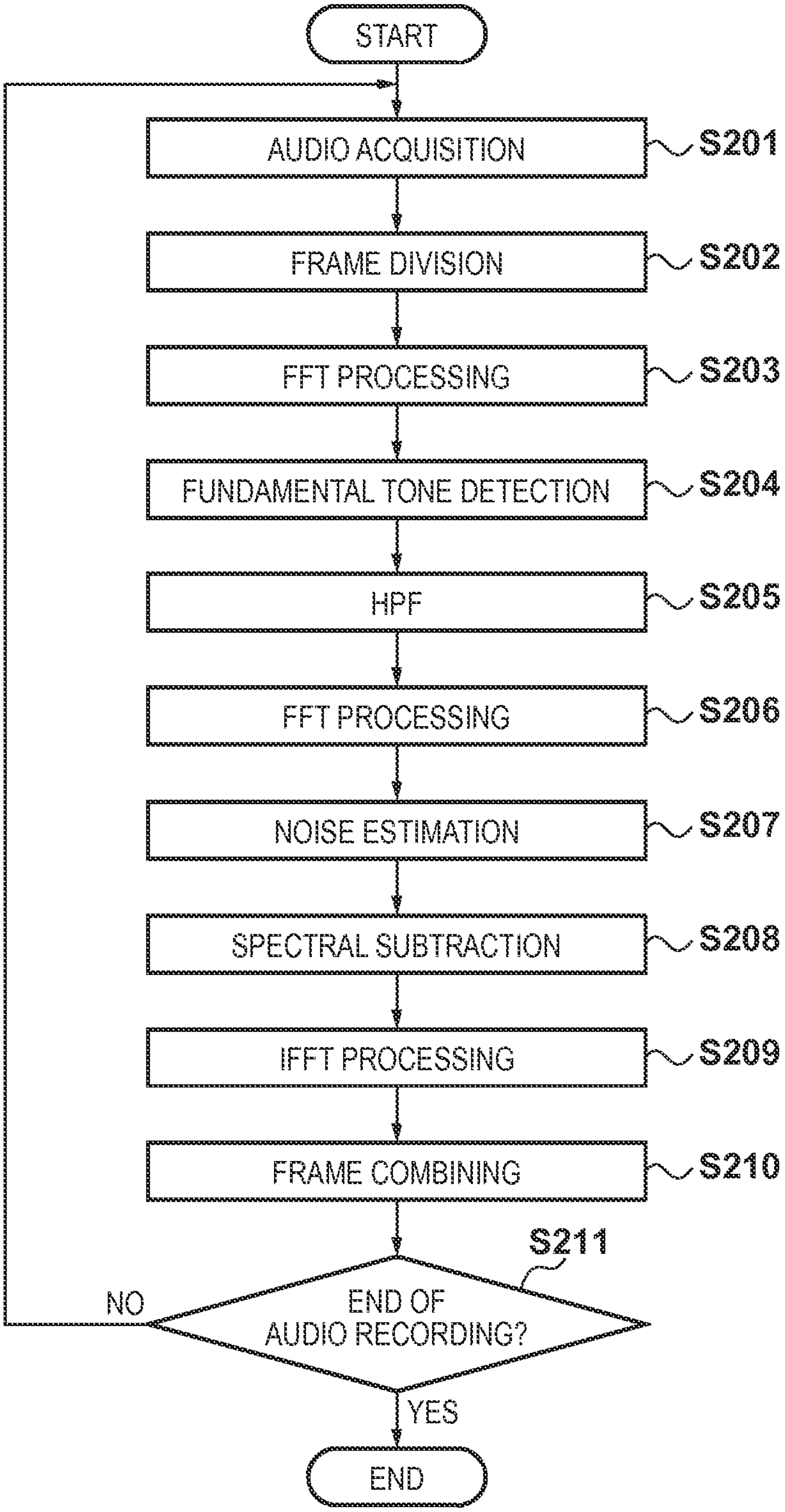
FIG. 6 is flowchart showing noise suppression processing according to the second embodiment.

The sequence of noise suppression processing according to this embodiment will be described below with reference to FIG. 6.

Steps S201 to S203 are the same as steps S101 to S103 of the first embodiment. That is, after audio recording is started, the audio signal input unit 100 acquires a mixed signal (step S201). The acquired mixed signal is output to the frame divider 200 as needed. Next, the frame divider 200 executes frame division processing (step S202). Subsequently, the FFT 301 executes FFT processing for outputs from the frame divider 200 (step S203). FFT-processed signals are output to the fundamental tone detector 303.

Next, the fundamental tone detector 303 executes fundamental tone detection (step S204). In this step, the fundamental tone detector 303 detects a fundamental tone of an audio signal included in a frame of interest by a cepstrum method based on the output from the FFT unit 301, and outputs a frequency of the fundamental tone to the HPF 307. When no fundamental tone is detected, the fundamental tone detector 303 outputs 0 Hz as a fundamental frequency. Next, the HPF 307 executes HPF processing for outputs from the frame divider 200 (step S205). In this step, the HPF 307 sets a boundary frequency based on a fundamental frequency as each output from the fundamental tone detector 303. Next, the HPF 307 sets the boundary frequency as its cutoff frequency, and applies HPF to each output from the frame divider 200, and outputs the filtered output to the FFT unit 308.

Subsequently, the FFT unit 308 executes FFT processing for outputs from the HPF 307 (step S206). FFT-processed signals are output to the spectral subtractor 305 and noise estimator 302.

Next, the noise estimator 302 executes noise estimation (step S207). This processing is the same as that in step S104 of the first embodiment. That is, the noise estimator 302 executes similarity comparison between input spectra and a wind noise model to determine estimated noise spectra. The estimated noise spectra are output to the spectral subtractor 305.

After that, the spectral subtractor 305 executes spectral subtraction (step S208). In this step, the spectral subtractor 305 executes the spectral subtraction using frequency spectra output from the FFT unit 308, those output from the noise estimator 302, and predetermined subtraction and flooring factors. Spectral subtraction results are output to the IFFT unit 306.

The IFFT unit 306 executes IFFT processing of outputs from the spectral subtractor 305 (step S209). IFFT-processed signals are output to the frame combiner 400. The frame combiner 400 executes processing for combining frame-processed signals (step S210). Then, whether or not audio recording ends is checked (step S211), and the processes of steps S201 to S210 are repeated until it is determined in this step that audio recording ends.

As described above, according to this embodiment, a boundary frequency is set based on a fundamental tone of an audio signal, and low-frequency components are suppressed by the HPF which uses that boundary frequency as a cutoff frequency. Since noise components are superposed on audio components, noise can be suppressed by further executing the spectral subtraction.

In this embodiment, the HPF is used. Alternatively, wind noise may be suppressed using, for example, a high-shelf filter in place of cutting low-frequency components. In place of the high-shelf filter, signals may be divided into bands using an HPF having a boundary frequency as a cutoff frequency, and a low-pass filter to apply processing for decreasing levels to outputs from the low-pass filter.

Third Embodiment

Figure 7:
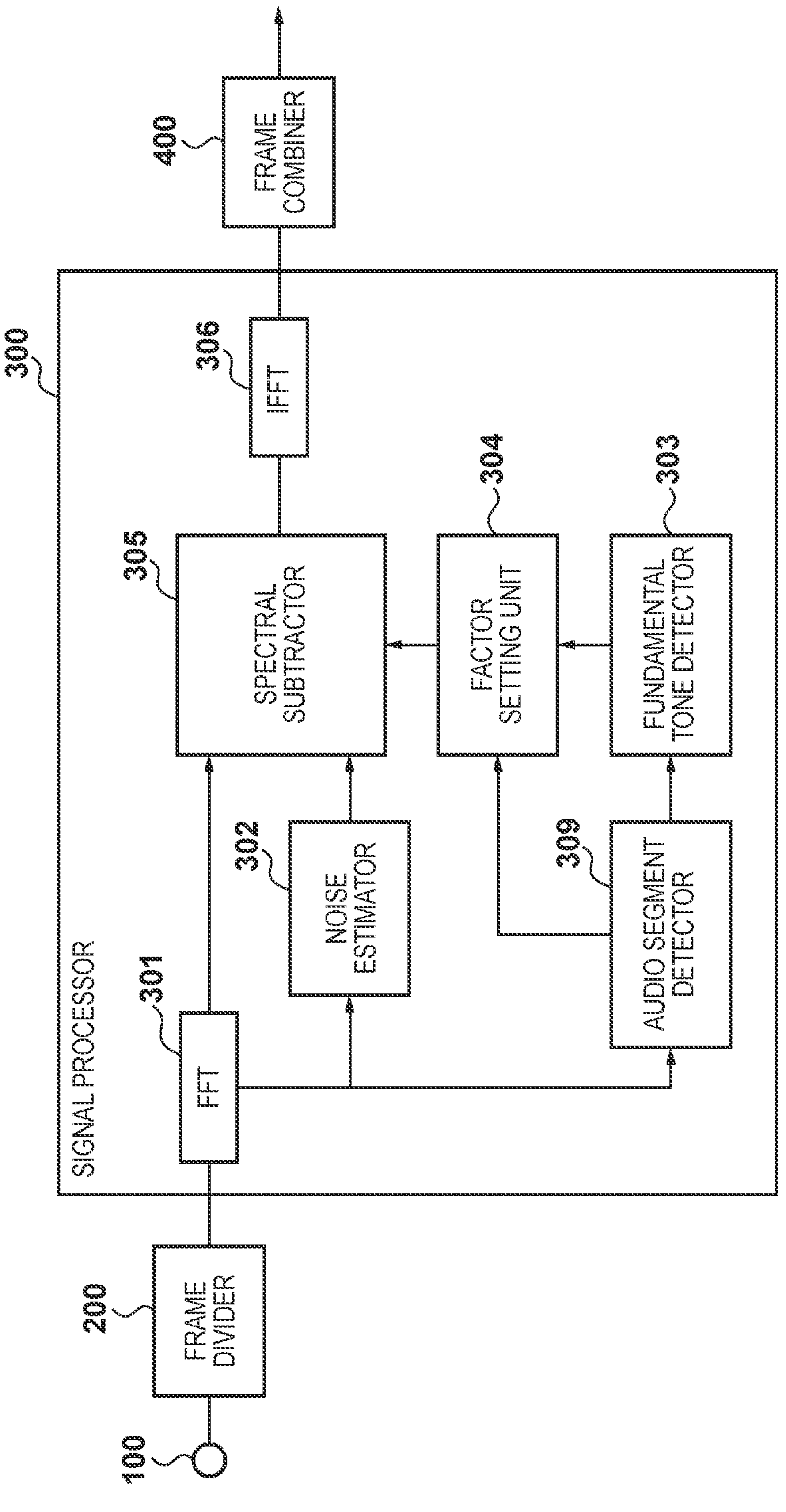
FIG. 7 is a block diagram showing the arrangement of a noise suppression apparatus according to the third embodiment.

An embodiment including audio segment detection processing will be described below. FIG. 7 is a block diagram showing the arrangement of a noise suppression apparatus according to this embodiment. The noise suppression apparatus of this embodiment includes an audio signal input unit 100, frame divider 200, signal processor 300, and frame combiner 400. Since the audio signal input unit 100, frame divider 200, and frame combiner 400 are the same as those in the first embodiment, a detailed description thereof will not be repeated.

The signal processor 300 shown in FIG. 7 has an arrangement in which an audio segment detector 309 is added between an FFT unit 301 and fundamental tone detector 303 to the arrangement shown in FIG. 1. Since the FFT unit 301, a noise estimator 302, the fundamental tone detector 303, a factor setting unit 304, a spectral subtractor 305, and an IFFT unit 306 are nearly the same as those in the first embodiment, a description thereof will not be repeated.

The audio segment detector 309 detects whether or not an output from the FFT unit 301 includes an audio segment, and outputs a detection result. As an audio segment detection method, for example, a Gaussian mixture model (for example, see "Speech Non-Speech Separation with Gmms", Reports of the Meeting of the Acoustical Society of Japan 2001 (2), pp. 141-142). In this method, audio and non-audio Gaussian mixture models are defined, and likelihood calculations of the Gaussian mixture models are made for each frame to judge whether or not an audio segment is included.

Figure 8:
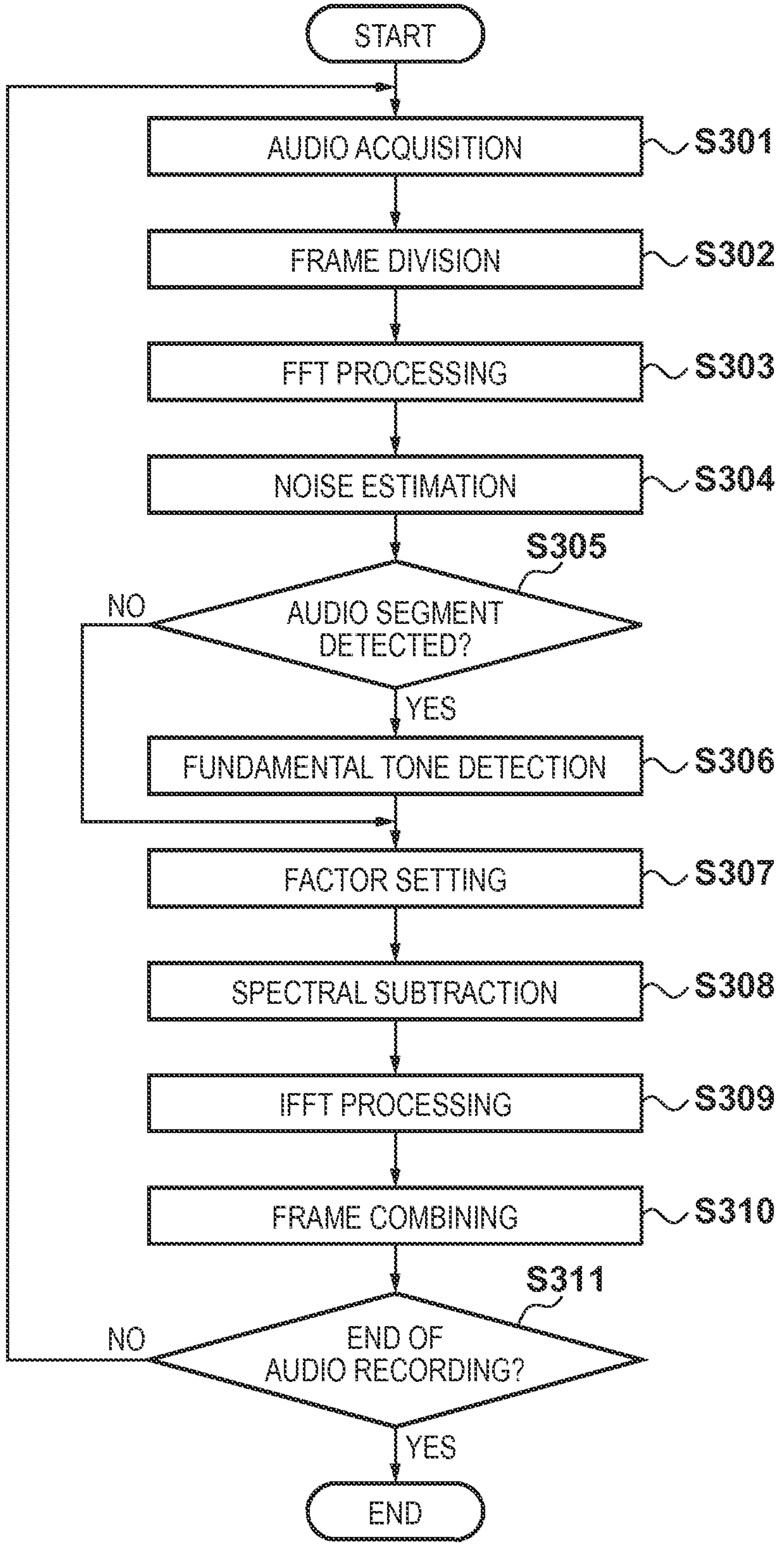
FIG. 8 is flowchart showing noise suppression processing according to the third embodiment.

The sequence of noise suppression processing according to this embodiment will be described below with reference to FIG. 8.

Steps S301 to S304 are the same as steps S101 to S104 of the first embodiment. That is, after audio recording is started, the audio signal input unit 100 acquires an audio signal (step S301). An acquired mixed signal is output to the frame divider 200 as needed. Next, the frame divider 200 executes frame division processing (step S302). Subsequently, the FFT unit 301 executes FFT processing for outputs from the frame divider 200 (step S303). FFT-processed signals are output to the noise estimator 302, spectral subtractor 305, and fundamental tone detector 303. Next, the noise estimator 302 executes noise estimation (step S304). In this case, the noise estimator 302 executes similarity comparison between input spectra and a wind noise model to determine estimated noise spectra. The estimated noise spectra are output to the spectral subtractor 305.

Next, the audio segment detector 309 detects an audio segment (step S305). In this step, the audio segment detector 309 detects an audio segment in each signal output form the FFT unit 301. When an audio segment is detected, the fundamental tone detector 303 executes fundamental tone detection (step S306). On the other hand, when no audio segment is detected, the audio segment detector 309 outputs a signal indicating a non-audio segment to the factor setting unit 304.

The factor setting unit 304 sets factors used in the spectral subtractor 305 (step S307). In this step, when a fundamental frequency is input from the fundamental tone detector 303 to the factor setting unit 304, the factor setting unit 304 sets a boundary frequency at a frequency not more than that fundamental frequency. Next, the factor setting unit 304 sets parameters of spectral subtraction. More specifically, the factor setting unit 304 sets large subtraction factors of the spectral subtraction and small flooring factors at frequencies lower than the boundary frequency. On the other hand, when the signal indicating a non-audio segment is input from the audio segment detector 309, the factor setting unit 304 sets a predetermined maximum frequency assumed for an audio signal as a boundary frequency. That is, the factor setting unit 304 sets large subtraction factors of the spectral subtraction and small flooring factors in the full frequency band. Spectral subtraction results are output to the IFFT unit 306.

The IFFT unit 306 executes IFFT processing for outputs from the spectral subtractor 305 (step S309). IFFT-processed signals are output to the frame combiner 400. The frame combiner 400 executes processing for combining frame-processed signals (step S310). Then, it is checked if audio recording ends (step S311). The processes of steps S301 to S310 are repeated until it is determined in this step that audio recording ends.

A segment which is determined as an audio segment but from which no fundamental tone is detected may be a consonant having no harmonic structure. Hence, in this embodiment, a boundary frequency of 0 Hz is set for such segment to apply normal processing in the full frequency band. On the other hand, a non-audio segment is distinguished from a segment which is determined as an audio segment but from which no fundamental tone is detected, and a maximum frequency is set as a boundary frequency for that segment, thus executing noise suppression in the full frequency band.

In this embodiment, the audio segment detector 309 executes audio segment detection in a stage after the frame divider 200. However, audio segment detection may be applied to a signal before frame division to output a signal indicating whether or not each frame corresponds to an audio segment.

The audio segment detector 309 may execute audio segment detection by another method. For example, a method based on an amplitude and the number of zero-crossings may be used (see "Voice Activity Detection Based on Optimally Weighted Combination of Multiple Features", IPSJ Study Report, SLP, Spoken Language Processing 2005 (69), pp. 49-54). In the method based on an amplitude and the number of zero-crossings, when the number of zero-crossings exceeds a predetermined count in an amplitude (power) segment which exceeds a predetermined level, a signal is determined as an audio signal. For example, when the method based on an amplitude and the number of zero-crossings is used, outputs from the frame divider 200 are input to the audio segment detector 309 without the intervention of the FFT unit 301. When an audio segment is included in half or more of a frame, the audio segment detector 309 determines that the frame includes an audio segment.

In the aforementioned embodiment, the factor setting unit 304 sets the maximum frequency as the boundary frequency when the audio segment detector 309 determines a non-audio segment. However, the boundary frequency may be set at 0 Hz in the same manner as the case in which no fundamental tone is detected, or the fundamental frequency of the previous frame may be used intact.

When processing for each frame abruptly changes, it audibly stands out. Hence, the factor setting unit 304 may change factors using a time constant so as to prevent a subtraction or flooring factor from abruptly changing at a boundary between a non-audio segment and audio segment.

Fourth Embodiment

Figure 9:
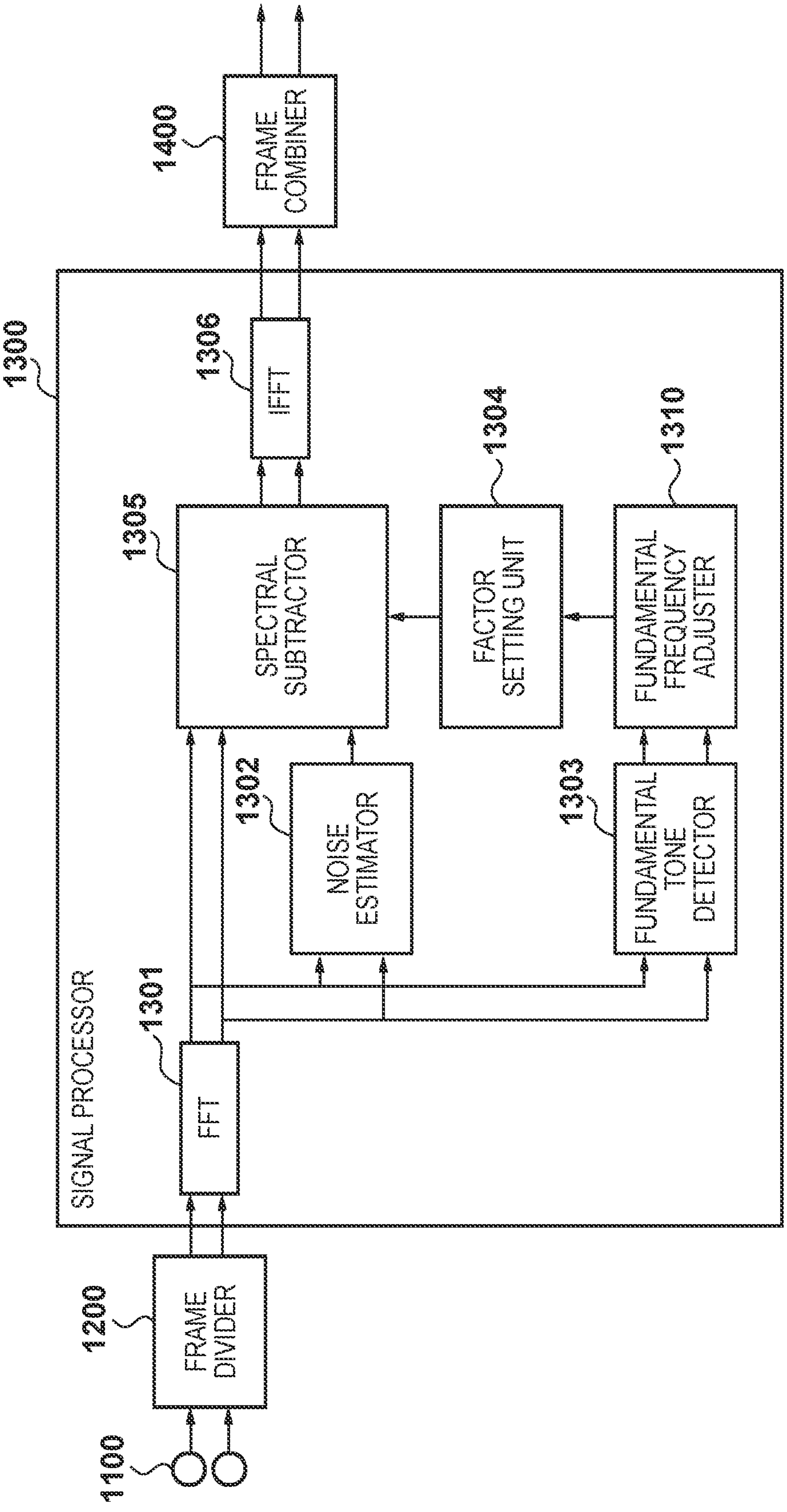
FIG. 9 is a block diagram showing the arrangement of a noise suppression apparatus according to the fourth embodiment.

An embodiment in case of multi-channel inputs, for example, two channels, will be described below. FIG. 9 is a block diagram showing the arrangement of a noise suppression apparatus according to this embodiment. The noise suppression apparatus of this embodiment includes an audio signal input unit 1100, frame divider 1200, signal processor 1300, and frame combiner 1400. The frame divider 1200, signal processor 1300, and frame combiner 1400 respectively correspond to the frame divider 200, signal processor 300, and frame combiner 400 of the first embodiment, which are extended to two channels. That is, these units respectively perform operations for audio signals of respective channels. The audio signal input unit 1100 includes two microphones which are arranged to be spaced apart from each other.

Figure 10:
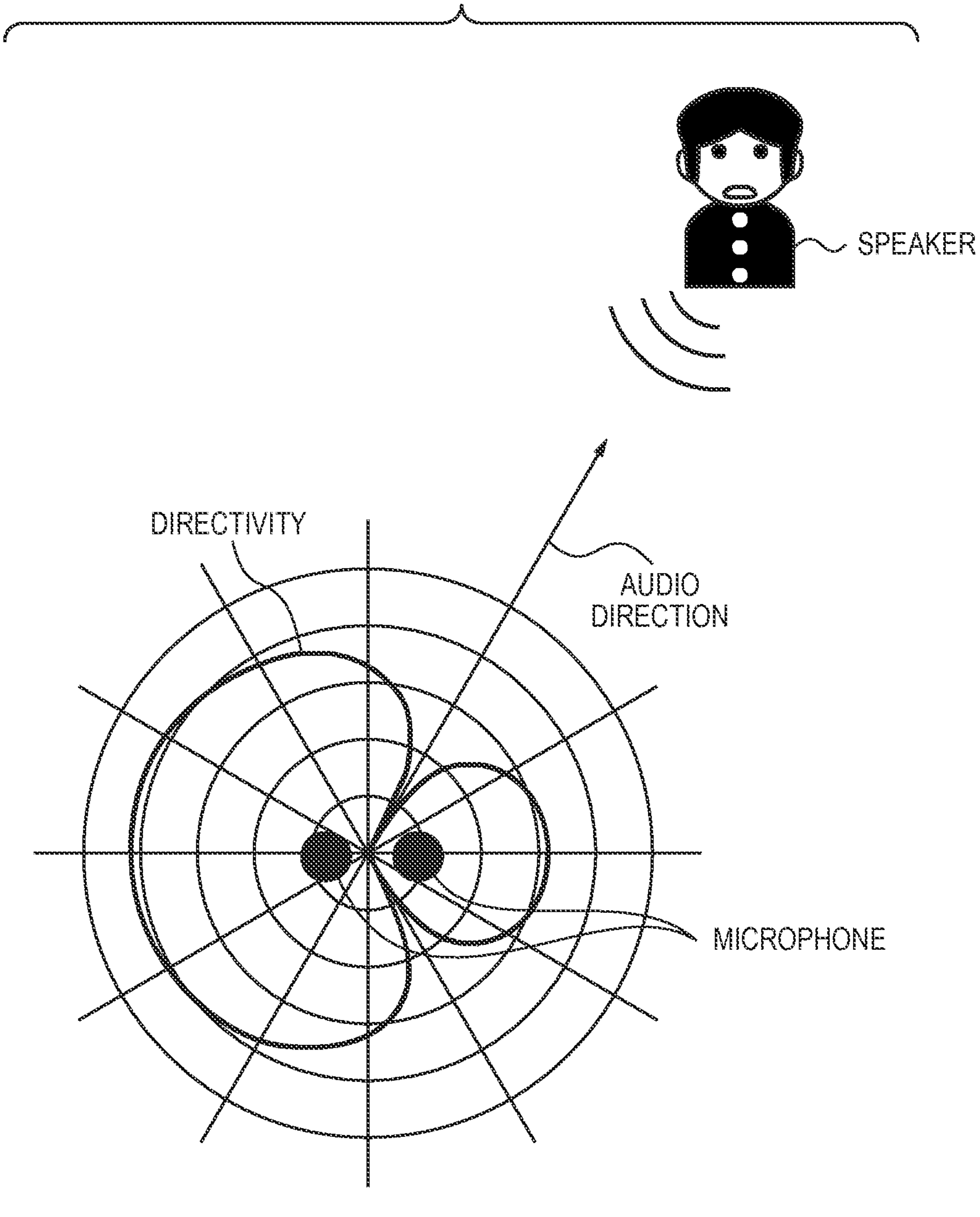
FIG. 10 is a chart showing an example of directivity formed by a beamformer.

The signal processor 1300 includes an FFT unit 1301, noise estimator 1302, fundamental tone detector 1303, factor setting unit 1304, spectral subtractor 1305, IFFT unit 1306, and fundamental frequency adjuster 1310. The FFT unit 1301, fundamental tone detector 1303, spectral subtractor 1305, and IFFT unit 1306 respectively correspond to the FFT unit 301, fundamental tone detector 303, spectral subtractor 305, and IFFT unit 306 of the first embodiment, which are extended for two channels. The noise estimator 1302 executes sound source separation processing for separating and extracting wind noise using signals input from the FFT unit 1301. The sound source separation processing uses, for example, a beamformer. A sound source direction of an audio is clearly determined with respect to a microphone, but wind noise is a non-directional sound source. For this reason, when directivity is set to direct a null in an audio direction, wind noise alone can be extracted. For example, when the minimum norm method is used, and when an audio energy is high, directivity can be formed to automatically direct a null in an audio direction, as shown in FIG. 10, and only wind noise except for an audio can be extracted. Frequency spectra of the extracted wind noise are output to the spectral subtractor 1305.

When the noise estimator 1302 uses a beamformer, only one output is obtained. However, when the two microphones of the audio signal input unit 1100 are sufficiently close to each other, since a correlation between wind noise components of the two channels is high, one output can be individually subtracted from the two channels as estimated noise.

To the fundamental frequency adjuster 1310, frequencies of fundamental tones of two channels detected by the fundamental tone detector 1303 are input. When the two microphones are disposed to be close to each other, the same fundamental tone is detected by the two channels. However, since different wind noise components are superposed on the two channels, fundamental tone detection errors are generated, and different values are often input from the two channels. Hence, the fundamental frequency adjuster 1310 outputs a lower frequency of the two input fundamental frequencies as a fundamental frequency to the factor setting unit 1304 so as not to suppress a fundamental tone.

Figure 11:
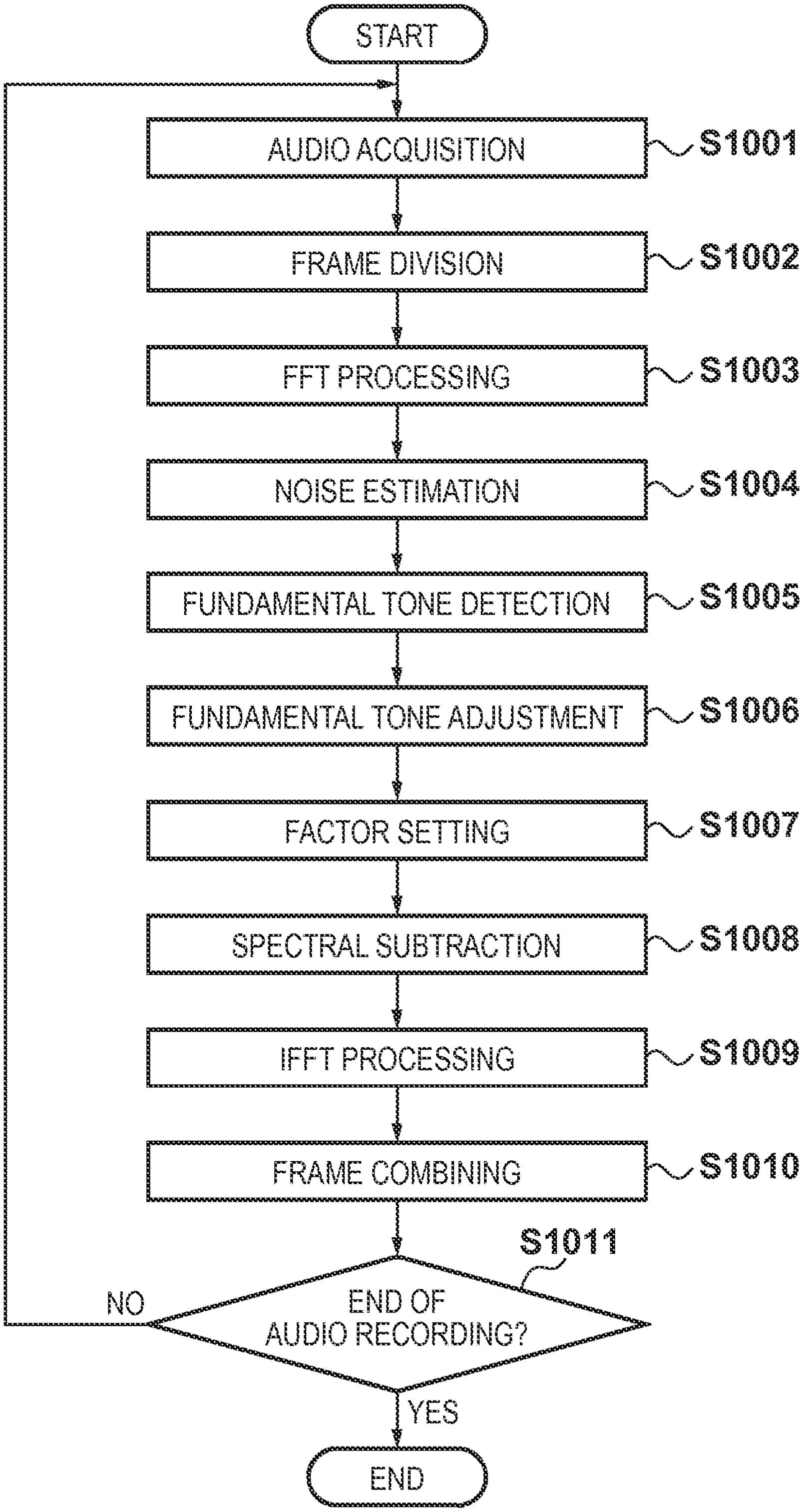
FIG. 11 is flowchart showing noise suppression processing according to the fourth embodiment.

The sequence of noise suppression processing according to this embodiment will be described below with reference to FIG. 11.

After audio recording is started, the audio signal input unit 1100 acquires audios of two channels (step S1001). Acquired mixed signals are output to the frame divider 1200 as needed. The frame divider 1200 executes frame division processing (step S1002). Subsequently, the FFT unit 1301 executes FFT processing for outputs from the frame divider 1200 (step S1003). FFT-processed signals are output to the fundamental tone detector 1303.

Next, the noise estimator 1302 executes noise estimation by means of sound source separation (step S1004). In this step, a beamformer based on the minimum norm method is executed for the FFT unit 1301. As a result, a null is formed in an audio direction, and tones other than the audio, that is, only wind noise is extracted. The extracted wind noise is output to the spectral subtractor 1305. Next, fundamental frequencies of the two channels detected by the fundamental tone detector 1303 are input to the fundamental frequency adjuster 1310, which adjusts a fundamental frequency to be output to the factor setting unit 1304 (step S1006). In this step, the fundamental frequency adjuster 1310 selects a lowest frequency of fundamental frequencies detected by respective channels, and outputs the selected frequency to the factor setting unit 1304 so as to avoid suppression of an audio signal.

Subsequent steps S1007 to S1011 are the same as steps S106 to S110 of the first embodiment. That is, the factor setting unit 1304 sets factors of spectral subtraction (step S1007). In this step, the factor setting unit 1304 sets a boundary frequency at a frequency not more than the fundamental frequency detected by the fundamental tone detector 1303. In this case, the fundamental frequency may be set as the boundary frequency. However, the boundary frequency may be set at a frequency lower than the fundamental frequency in consideration of fundamental tone detection errors caused by noise. Next, the factor setting unit 1304 sets parameters of the spectral subtraction. The factor setting unit 1304 sets large subtraction factors of the spectral subtraction and small flooring factors at frequencies lower than the boundary frequency. After that, the spectral subtractor 1305 executes the spectral subtraction (step S1008). In this step, the spectral subtractor 1305 executes the spectral subtraction using frequency spectra output from the FFT unit 1301, those output from the noise estimator 1302, and the subtraction and flooring factors set by the factor setting unit 1304. Results of the spectral subtraction are output to the IFFT unit 1306.

The IFFT unit 1306 executes IFFT processing for outputs from the spectral subtractor 1305 (step S1009). IFFT-processed signals are output to the frame combiner 1400. The frame combiner 1400 executes processing for combining frame-processed signals (step S1010). In this step, the frame combiner 1400 combines the signals for respective frames, which have been divided into frames by the frame divider 1200, and have undergone the processes, to overlap each other while shifting the signals by the predetermined duration in the same manner as in division. Then, it is checked if audio recording ends (step S1011). The processes of steps S1001 to S1010 are repeated until it is determined in this step that audio recording ends.

As described above, in case of the two channels, noise can be estimated using a sound source separation technology. Furthermore, by adjusting the fundamental frequency, a possibility of reduction of the fundamental tone due to a fundamental tone detection error can be reduced. For this reason, wind noise can be suppressed without unnecessarily suppressing a low-frequency range of an audio signal.

In this embodiment, the noise estimator 1302 executes the noise estimation using the beamformer. For example, as disclosed in Japanese Patent Laid-Open No. 2006-154314, a method using independent component analysis and inverse projection, and SIMO-ICA may be used. Also, as disclosed in Japanese Patent Laid-Open No. 2012-22120, a method using non-negative matrix factorization may be used. Using these methods, estimated noise signals can be obtained for respective channels although the beamformer can obtain only one estimated noise signal.

The beamformer of the noise estimator 1302 directs a null in a sound source direction using the minimum norm method. However, the present invention is not limited to this. For example, when an audio direction can be detected by sound source direction estimation or the like, a null may be directed to that direction.

The fundamental frequency adjuster 1310 outputs a lower frequency of two fundamental frequencies to the factor setting unit 1304 as a fundamental frequency. Alternatively, the fundamental frequency adjuster 1310 may output an average value of the two channels as the fundamental frequency. When input fundamental tones of the two channels are largely different, the fundamental frequency adjuster 1310 may select a fundamental tone to be output based on reliabilities of the fundamental tones of the respective channels. For example, the fundamental frequency adjuster 1310 may hold fundamental tones of previous frames, and may output a fundamental tone having a smaller change amount of the two fundamental tones as a highly reliable fundamental frequency in consideration of continuity from previous fundamental tones. Alternatively, the fundamental tone detector 1303 may output reliabilities upon fundamental tone detection together. When the fundamental tone detector 1303 executes fundamental tone detection based on cepstra, it may output feature amounts such as peak heights or widths of cepstra. The fundamental frequency adjuster 1310 selects a fundamental tone having a high peak and narrow width of a cepstrum upon fundamental tone detection as a reliable fundamental tone. Also, fundamental tones may be weighted-averaged according to their reliabilities.

In this embodiment, the mixed signals of the two channels are handled. The present invention is applicable to mixed signals of three or more channels. When the audio signal input unit 1100 has three or more channels, the fundamental frequency adjuster 1310 compares input fundamental frequencies of respective channels to determine whether or not an outlier is included. When an outlier is found, the fundamental frequency adjuster 1310 outputs an average value of channels other than the outlier. For example, whether or not an outlier is included is determined using:

$$n \cdot \sigma = f_m - \mu$$

where m is a channel, $f_m$ is a fundamental frequency of the m-th channel, μ is an average value of fundamental frequencies of all channels, and σ is a standard deviation. In this case, assuming that 2σ or more is defined as an outlier, whether or not the fundamental frequency $f_m$ of the m-th channel is an outlier can be determined. For example, when there are eight channel inputs, and fundamental frequencies of these channels are as shown in FIG. 12, an average value is 144.6 Hz, and a standard deviation is 18.6 Hz. Therefore, assuming that 2σ or more is defined as an outlier, the upper limit is 181.8 Hz, the lower limit is 107.4 Hz, and the sixth channel becomes the outlier. Since an average except for the outlier is 151 Hz, "151 Hz" is output.

When the audio signal input unit 1100 has a plurality of inputs, degrees of mixed wind noise may often be different. Hence, the noise estimator 1302 may estimate noise amounts for respective channels, and a fundamental frequency of a channel corresponding to the smallest estimated noise amount may be output.

In the aforementioned embodiments, the audio signal input unit includes a microphone or microphone array. For example, the audio signal input unit may load a file of a mixed signal, which is recorded in advance. In this case, fundamental tone detection and noise estimation may be respectively executed for a full signal section in advance, and signals corresponding to respective frames may then be output.

Furthermore, when the file is loaded, fundamental tone detection is initially applied to all frames. After that, one or more series of frames in which no fundamental tone is detected may be extrapolated or interpolated using fundamental frequencies detected in previous or subsequent frames or in both these frames. FIG. 13 shows an interpolation example using fundamental frequencies detected in previous or subsequent frames or in both these frames when fundamental tone detection fails. Especially, cases will be described below wherein no fundamental tone is detected in a first frame, in a plurality of continuous frames, and in a last frame. For frame 1 in which no fundamental tone is detected, a frequency "150 Hz" which is the same as values of frames 2 and 3 is output. When no fundamental tone is continuously detected like frames 5 to 8, linear interpolation is executed using values of frames 4 and 9. An interpolation method is not limited to linear interpolation, but spline interpolation and the like may be used. For frame 11, a frequency "100 Hz" which is the same as a value of frame 10 is output.

Also, a unit, which detects a length of a segment in which no fundamental tone is detected of a frame may be arranged. When that segment is longer than a predetermined segment, that segment may be determined as a non-audio segment to set a maximum frequency as the boundary frequency; when that segment is shorter than the predetermined segment, 0 Hz may be set as the boundary frequency.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286163, filed Dec. 27, 2012, which is hereby incorporated by reference herein in its entirety.

What is claimed is:

1. A noise suppression apparatus for suppressing noise components included in a mixed signal, in which audio components and the noise components are mixed, by spectral subtraction, comprising:

a noise estimation unit configured to estimate the noise components included in the mixed signal;

a fundamental tone detection unit configured to detect a fundamental frequency of the mixed signal;

a factor setting unit configured to set a subtraction factor in the spectral subtraction based on the detected fundamental frequency; and a spectral subtraction unit configured to execute the spectral subtraction for the mixed signal using the set subtraction factor and the estimated noise components, wherein said factor setting unit sets a boundary frequency at the fundamental frequency or a frequency lower than the fundamental frequency, and sets a subtraction factor for a frequency lower than the boundary frequency to assume a value larger than a subtraction factor for a frequency not less than the boundary frequency.

2. The apparatus according to claim 1, further comprising a high-pass filter configured to apply high-pass filter processing to the mixed signal in a stage before said spectral subtraction unit, a cutoff frequency of said high-pass filter being variable, wherein said high-pass filter sets the boundary frequency as a cutoff frequency.

3. The apparatus according to claim 1, further comprising an audio segment detection unit configured to detect an audio segment, wherein said fundamental tone detection unit executes detection of a fundamental frequency when said audio segment detection unit detects the audio segment.

4. The apparatus according to claim 3, wherein when said audio segment detection unit does not detect an audio segment, said factor setting unit sets a predetermined maximum frequency assumed for the mixed signal as the boundary frequency.

5. The apparatus according to claim 3, wherein when said audio segment detection unit does not detect an audio segment, said factor setting unit sets 0 Hz as the boundary frequency.

6. The apparatus according to claim 3, wherein when said audio segment detection unit does not detect an audio segment, said factor setting unit sets the boundary frequency based on a fundamental frequency of a previous frame.

7. The apparatus according to claim 1, wherein the mixed signal includes mixed signals of a plurality of channels, the respective units respectively operate for the mixed signals of the respective channels; and said apparatus further comprises a fundamental frequency adjustment unit configured to select a lowest frequency of fundamental frequencies of the respective channels detected by said fundamental tone detection unit, and to output the selected frequency to said factor setting unit.

8. The apparatus according to claim 7, wherein said noise estimation unit uses a sound source separation technology based on one of a beamformer, independent component analysis, and non-negative matrix factorization.

9. The apparatus according to claim 1, wherein when a fundamental tone is not detected in a current frame, said fundamental tone detection unit outputs a fundamental frequency output in a previous frame.

10. The apparatus according to claim 1, wherein said fundamental tone detection unit interpolates at least one series of frames in which a fundamental tone is not detected using a fundamental frequency detected in a previous frame, a subsequent frame, or both the frames of the series of frames.

11. The apparatus according to claim 1, wherein when a fundamental tone is not detected, said fundamental tone detection unit outputs 0 Hz as a fundamental frequency.

12. The apparatus according to claim 1, wherein when a fundamental tone is not detected, said fundamental tone detection unit outputs a predetermined maximum frequency assumed for the mixed signal as a fundamental frequency.

13. A noise suppression apparatus for suppressing noise components included in a mixed signal, in which audio components and the noise components are mixed, by spectral subtraction, comprising:

a noise estimation unit configured to estimate the noise components included in the mixed signal;

a fundamental tone detection unit configured to detect a fundamental frequency of the mixed signal;

a factor setting unit configured to set a flooring factor in the spectral subtraction based on the detected fundamental frequency; and a spectral subtraction unit configured to execute the spectral subtraction for the mixed signal using the set flooring factor and the estimated noise components, wherein said factor setting unit sets a boundary frequency at the fundamental frequency or a frequency lower than the fundamental frequency, and sets a flooring factor for a frequency lower than the boundary frequency to assume a value smaller than a flooring factor for a frequency not less than the boundary frequency.

14. A noise suppression apparatus for suppressing noise components included in a mixed signal, in which audio components and the noise components are mixed, by spectral subtraction, comprising:

a noise estimation unit configured to estimate the noise components included in the mixed signal;

a fundamental tone detection unit configured to detect a fundamental frequency of the mixed signal;

a factor setting unit configured to set a subtraction factor and a flooring factor in the spectral subtraction based on the detected fundamental frequency; and a spectral subtraction unit configured to execute the spectral subtraction for the mixed signal using the set subtraction factor, the set flooring factor, and the estimated noise components, wherein said factor setting unit sets a boundary frequency at the fundamental frequency or a frequency lower than the fundamental frequency, sets a subtraction factor for a frequency lower than the boundary frequency to assume a value larger than a subtraction factor for a frequency not less than the boundary frequency, and sets a flooring factor for a frequency lower than the boundary frequency to assume a value smaller than a flooring factor for a frequency not less than the boundary frequency.

15. A control method of a noise suppression apparatus for suppressing noise components included in a mixed signal, in which audio components and the noise components are mixed, by spectral subtraction, the method comprising:

a noise estimation step of estimating the noise components included in the mixed signal;

a fundamental tone detection step of detecting a fundamental frequency of the mixed signal;

a factor setting step of setting a subtraction factor in the spectral subtraction based on the detected fundamental frequency; and a spectral subtraction step of executing the spectral subtraction for the mixed signal using the set subtraction factor and the estimated noise components, wherein in the factor setting step, a boundary frequency is set at the fundamental frequency or a frequency lower than the fundamental frequency, and a subtraction factor for a frequency lower than the boundary frequency is set to assume a value larger than a subtraction factor for a frequency not less than the boundary frequency.

16. A control method of a noise suppression apparatus for suppressing noise components included in a mixed signal, in which audio components and the noise components are mixed, by spectral subtraction, the method comprising:

a noise estimation step of estimating the noise components included in the mixed signal;

a fundamental tone detection step of detecting a fundamental frequency of the mixed signal;

a factor setting step of setting a flooring factor in the spectral subtraction based on the detected fundamental frequency; and a spectral subtraction step of executing the spectral subtraction for the mixed signal using the set flooring factor and the estimated noise components, wherein in the factor setting step, a boundary frequency is set at the fundamental frequency or a frequency lower than the fundamental frequency, and a flooring factor for a frequency lower than the boundary frequency is set to assume a value smaller than a flooring factor for a frequency not less than the boundary frequency.

17. A control method of a noise suppression apparatus for suppressing noise components included in a mixed signal, in which audio components and the noise components are mixed, by spectral subtraction, the method comprising:

a noise estimation step of estimating the noise components included in the mixed signal;

a fundamental tone detection step of detecting a fundamental frequency of the mixed signal;

a factor setting step of setting a subtraction factor and a flooring factor in the spectral subtraction based on the detected fundamental frequency; and a spectral subtraction step of executing the spectral subtraction for the mixed signal using the set subtraction factor, the set flooring factor, and the estimated noise components, wherein in the factor setting step, a boundary frequency is set at the fundamental frequency or a frequency lower than the fundamental frequency, a subtraction factor for a frequency lower than the boundary frequency is set to assume a value larger than a subtraction factor for a frequency not less than the boundary frequency, and a flooring factor for a frequency lower than the boundary frequency is set to assume a value smaller than a flooring factor for a frequency not less than the boundary frequency.

18. A non-transitory computer-readable storage medium storing a program for controlling a computer to function as respective units included in a noise suppression apparatus according to claim 1.

* * * * *